(12) United States Patent
Van Hoecke et al.

(10) Patent No.: US 10,633,006 B2
(45) Date of Patent: Apr. 28, 2020

(54) METHOD AND APPARATUS FOR ADAPTIVE VEHICLE FEATURE RECOMMENDATIONS

(71) Applicant: FORD GLOBAL TECHNOLOGIES, LLC, Dearborn, MI (US)

(72) Inventors: Patrick Lawrence Jackson Van Hoecke, Dearborn, MI (US); Danielle Rosenblatt, Dearborn, MI (US); Anthony Melatti, Dearborn, MI (US); Hamid M. Golgiri, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 17 days.

(21) Appl. No.: 15/961,188

(22) Filed: Apr. 24, 2018

(65) Prior Publication Data
US 2019/0322290 A1 Oct. 24, 2019

(51) Int. Cl.
| | | |
|---|---|---|
| B60W 50/04 | (2006.01) | |
| B60W 50/14 | (2020.01) | |
| H04W 4/40 | (2018.01) | |
| H04L 29/08 | (2006.01) | |
| B60W 50/00 | (2006.01) | |

(52) U.S. Cl.
CPC ............ *B60W 50/14* (2013.01); *H04L 67/34* (2013.01); *H04W 4/40* (2018.02); *B60W 2050/0064* (2013.01)

(58) Field of Classification Search
None
See application file for complete search history.

(56) References Cited

U.S. PATENT DOCUMENTS

| | | | | |
|---|---|---|---|---|
| 6,956,470 B1* | 10/2005 | Heise | .................... | B60K 35/00 |
| | | | | 340/438 |
| 7,720,680 B2* | 5/2010 | Weng | .................. | G10L 15/1822 |
| | | | | 704/235 |
| 7,895,529 B1 | 2/2011 | Simons et al. | | |
| 8,190,324 B2* | 5/2012 | Hattori | ............... | G07C 9/00309 |
| | | | | 340/438 |
| 8,376,747 B2* | 2/2013 | Powers | ............... | B60R 16/0231 |
| | | | | 434/62 |

(Continued)

FOREIGN PATENT DOCUMENTS

| | | |
|---|---|---|
| CN | 104076716 A | 10/2014 |
| WO | 2017078678 A1 | 5/2017 |

OTHER PUBLICATIONS

60/75? $8,500 for battery unlock? (Submitted by FelixMendeldog on Jun. 12, 2012). Retrieved from https://forums.tesla.com//forum/forums/6075-8500-battery-unlock (9 pages).

*Primary Examiner* — Jonathan M Dager
(74) *Attorney, Agent, or Firm* — Michael Spenner; Brooks Kushman PC

(57) ABSTRACT

A system includes a processor configured to determine that measured vehicle variable values match a predefined set of vehicle variable values associated with recommending vehicle feature engagement. The processor is further configured to determine that the feature has not been used with a threshold frequency in a vehicle in which the variable values were measured. Also, the processor is configured to responsive to the match and use below the threshold, present a recommendation to engage the feature.

20 Claims, 4 Drawing Sheets

(56) References Cited

U.S. PATENT DOCUMENTS

| | | | |
|---|---|---|---|
| 8,892,297 B2 | 11/2014 | Inbarajan | |
| 9,104,537 B1* | 8/2015 | Penilla | G06F 17/00 |
| 9,501,875 B2* | 11/2016 | Gurovich | G07C 5/008 |
| 2002/0015056 A1* | 2/2002 | Weinlaender | G06F 9/453 |
| | | | 715/705 |
| 2002/0082751 A1* | 6/2002 | Obradovich | B60G 17/0195 |
| | | | 701/1 |
| 2003/0113702 A1* | 6/2003 | Matumoto | G11B 33/027 |
| | | | 434/365 |
| 2004/0019591 A1* | 1/2004 | Gardner | G06F 16/20 |
| 2004/0233045 A1* | 11/2004 | Mays | B60K 35/00 |
| | | | 340/425.5 |
| 2005/0108249 A1* | 5/2005 | Schalk | G06Q 30/02 |
| 2005/0216458 A1* | 9/2005 | Morris | B60K 35/00 |
| 2006/0247836 A1* | 11/2006 | Mansell | A61C 5/04 |
| | | | 701/36 |
| 2006/0287787 A1* | 12/2006 | Engstrom | G01C 21/26 |
| | | | 701/36 |
| 2007/0106439 A1* | 5/2007 | Lin | H03J 1/0025 |
| | | | 701/36 |
| 2008/0278298 A1* | 11/2008 | Waeller | B60K 35/00 |
| | | | 340/425.5 |
| 2009/0144622 A1* | 6/2009 | Evans | G01C 21/00 |
| | | | 715/706 |
| 2009/0299569 A1* | 12/2009 | Knoll | B60W 50/14 |
| | | | 701/36 |
| 2010/0042498 A1 | 2/2010 | Schalk | |
| 2010/0286867 A1* | 11/2010 | Bergholz | B60K 35/00 |
| | | | 701/36 |
| 2015/0012170 A1 | 1/2015 | Pita-Gil et al. | |
| 2016/0034146 A1 | 2/2016 | Daly, Jr. et al. | |
| 2016/0042576 A1 | 2/2016 | Fischer et al. | |
| 2016/0198306 A1* | 7/2016 | Miles | G01C 21/3697 |
| | | | 455/456.3 |
| 2017/0015246 A1 | 1/2017 | Honghalli Devaraju | |
| 2017/0097241 A1* | 4/2017 | Prokhorov | G05D 1/0088 |
| 2017/0313268 A1 | 11/2017 | Dalke | |
| 2018/0329950 A1* | 11/2018 | King | G06F 7/582 |

\* cited by examiner

METHOD AND APPARATUS FOR ADAPTIVE VEHICLE FEATURE RECOMMENDATIONS

TECHNICAL FIELD

The illustrative embodiments generally relate to methods and apparatuses for adaptive vehicle feature recommendations.

BACKGROUND

With thousands of vehicle engineers and rapidly improving vehicle technology, vehicle original equipment manufacturers (OEMs) continually provide increased features for customer utilization. The vehicle is a highly complex computing system with a massive number of controls and inputs, and these features give customers a good deal of control over the driving experience and vehicle environment.

Unfortunately, like many complex technical systems, learning all of these features is sometimes difficult. Drivers are often focused on the task of driving, and few people sit in their vehicle for long periods of time when parked, so the opportunities to interact with a vehicle to learn all about its functionality are limited. Many customers can go the entire life of a lease or even a vehicle without ever fully utilizing the features that the vehicle provides.

If customers knew about the features, and how to use them all, the customers might experience a significant improvement in their opinion about the vehicle, the vehicle experience and even the vehicle manufacturer. Unless those customers are willing to sit through vehicle demonstrations before purchase, or read substantial vehicle manuals, however, the chance of those customers missing out on useful and interesting features remains fairly high.

SUMMARY

In a first illustrative embodiment, a system includes a processor configured to determine that measured vehicle variable values match a predefined set of vehicle variable values associated with recommending vehicle feature engagement. The processor is further configured to determine that the feature has not been used with a threshold frequency in a vehicle in which the variable values were measured. Also, the processor is configured to responsive to the match and use below the threshold, present a recommendation to engage the feature.

In a second illustrative embodiment, a system includes a mobile-device processor configured to receive an indicator corresponding to a recommended vehicle feature. The processor is also configured to determine that the feature includes a configuration option. The processor is also configured to present a configuration option allowing for configuration of the vehicle feature on a mobile device and send a modified configuration, configured using the configuration option, from the mobile device to a vehicle.

In a third illustrative embodiment, a system includes a processor configured to determine that a vehicle feature has been used less than a manufacturer defined frequency. The processor is also configured to request conditional data indicating when other users are using the vehicle feature. Further, the processor is configured to receive the requested conditional data and recommend that the vehicle feature be used responsive to measured vehicle conditions fitting parameters defined by the conditional data.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
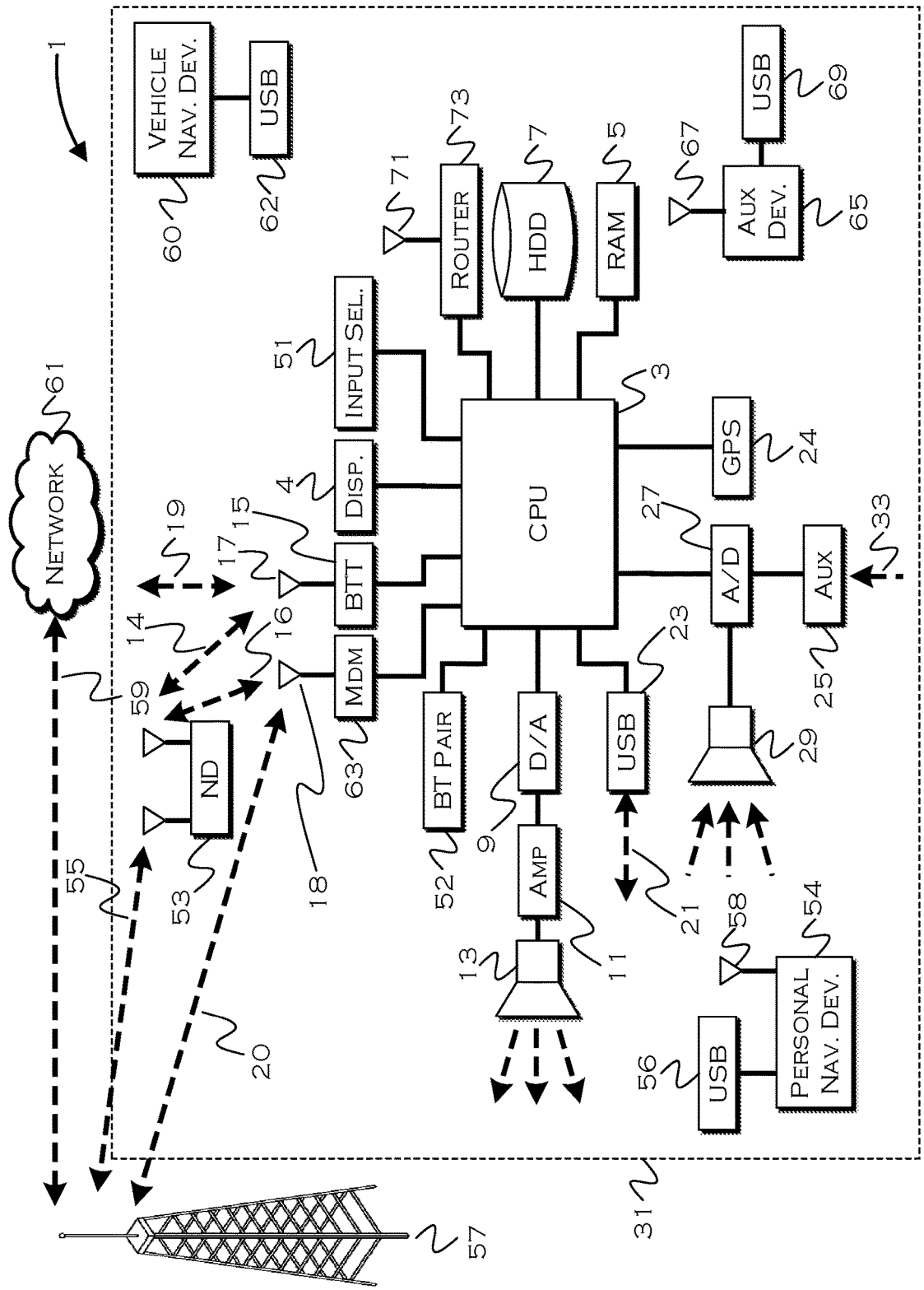
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output.

The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments allow for real-time reminders of vehicle feature usage options based on observed user and crowd behavior. Vehicles currently represent very high tech machines, with a vast array of options and features that frequently go unused by many drivers due to ignorance of the feature or a lack of understanding about when a feature is applicable.

While it is useful to periodically remind drivers about the existence of these features, mere information may be occasionally insufficient. For example, if a vehicle has a snow-traction mode, which is appropriate for icy driving, and the vehicle simply periodically reminds the driver about the availability of this feature, that may never translate into feature usage, because the driver may still not remember to engage the feature during the appropriate conditions. Under the illustrative embodiments, however, the vehicle and an accompany data gathering and sharing system can track when such features are commonly used (by locality or under conditions), and can thus remind drivers in real time that, for example, most other drivers in the area are using the feature currently and/or under the current weather conditions, it would be a good time to engage the feature.

Manufacturers may pre-associate certain conditionals with features, but those conditionals may not always reflect actual usage. By allowing for the conditionals to be modified based on when knowledgeable drivers are using the features, a second opportunity to notify drivers of available features is created. In a similar manner, drivers may be advised not to use a certain feature based on OEM parameters, but over time the OEM may discover that many drivers use the feature despite such alerts, and therefore it may be time to adjust the parameters for when the feature is used. Since the recommendations can be generated based on conditions and/or localities, environmentally reactive feature use can be recommended, even if sufficient environmental data is not available. That is, if weather conditions are appropriate for snow-traction in a region, even if the weather data is not available, the fact that X % of the drivers in the region have engaged snow-traction may be sufficient to recommend the usage of the same. This could also accommodate fast-forming conditions, such as black ice, which may not be reflected in the current precipitation data, but may be represented by the reality of multiple drivers engaging advanced traction controls within a locality.

This sort of data and recommendation is also useful in rental vehicles, where drivers may not be particularly familiar with a given feature. The vehicle can recommend a feature and present visual or audible clues or cues as to how to activate the feature, so a driving user does not have to remove much attention from driving in order to engage the feature. In another example, the process may wait until he vehicle is stopped before notifying the user of features which may be newly used or require a more complex interaction to engage.

Figure 2:
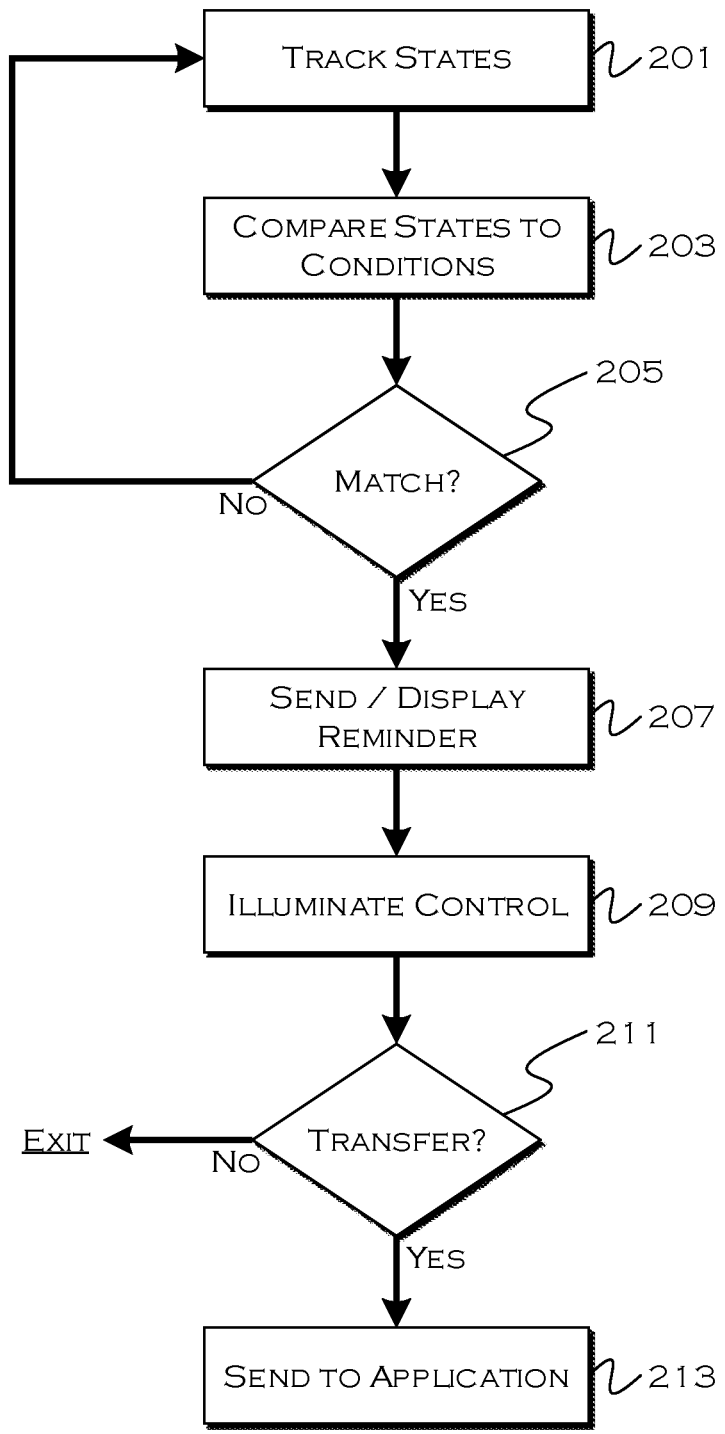
FIG. 2 shows an illustrative process for feature usage recommendation.

FIG. 2 shows an illustrative process for feature usage recommendation. In this example, a set of vehicle features each has a conditional associated therewith, representing environmental or other states under which the feature is recommended. The vehicle tracks 201 the state variables associated with the conditionals, and continually compares 203 the collected state values to trigger conditions associated with the vehicle. The collected/measured state values can also be those of proximate, detectable vehicles, such as proximate vehicle location, kinematics, speed, acceleration, etc. Wireless data received from other proximate vehicles, indicating these and similar states, can also supplement this data.

If the aggregated state values ever match 205 or otherwise indicate an appropriate but currently disengaged feature (or match a condition for disengaging a currently engaged feature), the process may send 207 a reminder to an occupant device and/or use a vehicle visual or audible output to recommend a feature. For example, the process could display "current conditions indicate possible slippery travel, transition to snow-traction mode is recommended." The display could also include a touch button for feature engagement, an arrow pointing to a feature control within the vehicle interior, or other indicators of how the feature could be engaged. This engagement may also include presenting a visual color on the display and illuminating 209 a feature control with the same color, so the user knows to which control the message refers.

The display or options may also include an option (or this may be an automatic action) to push 211 a reminder to a mobile application. For features which require advanced configuration and/or further understanding, the user may want to read about the feature before using the feature. If the transfer is automatic or the option is selected, the process may send 213 information about the feature to a mobile application. This can allow the user to use the mobile application to read about the feature and this may inform future usage of the feature. Automatic information pushing may be enabled so that even if the user uses the feature, there is also a reminder pushed to the user's mobile device so the user can later read about the feature, understand the feature and even configure configurable aspects of the feature while in a non-driving environment.

Figure 3:
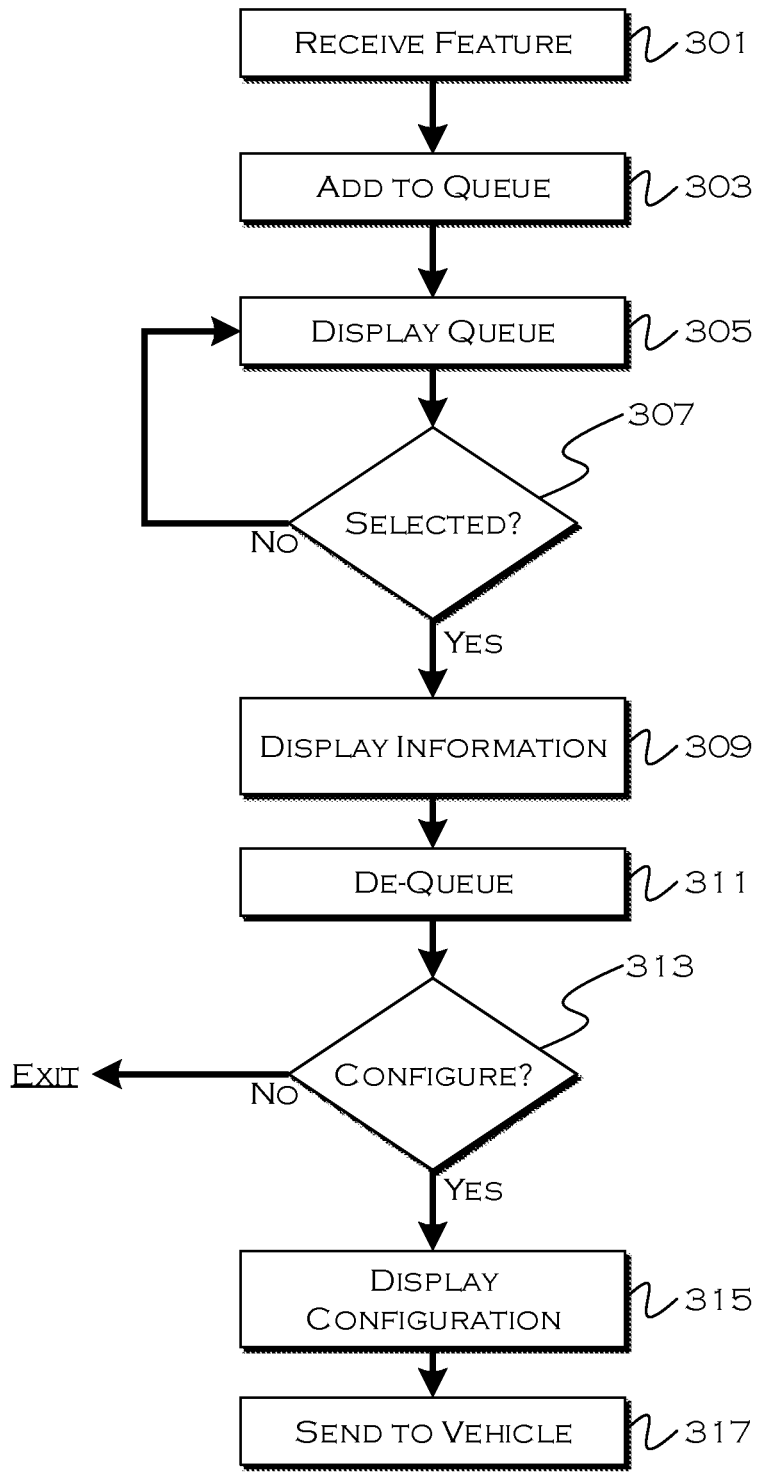
FIG. 3 shows an illustrative process for mobile-phone based feature presentation and configuration.

FIG. 3 shows an illustrative process for mobile-phone based feature presentation and configuration. In this example, the process may receive 301 an indicator of a recommended feature from a vehicle system associated with the user and/or mobile device. This can relate to a feature recommended by the vehicle, or used by the user, and the data may include a current configuration of a configurable feature on the vehicle.

The process may add 303 the feature to a queue on the mobile device, so when the user next launches the corresponding mobile application, the process may display 305 the current queue of features that have been recommended or newly used. This list can also include any configurable features, whether or not they are frequently used, if they have not yet been customized by a user.

The user can select 307 a particular feature from the list, and the process can display 309 explanatory information about what the feature does. This data can be obtained in conjunction with the notification, or prestored on the vehicle. This data may also include a dynamic component reflecting current parameters for recommended usage, so the user may see, for example "Snow-Track mode provides advanced multi-wheel traction control for icy conditions. This feature is currently used by drivers in your area when conditions are below 32 degrees and there has been precipitation within the last 24 hours." An associated configuration option may allow configuration of the feature, which, for something like Snow-Track, may simply be an automatic engagement of the control under certain conditions. Further configuration may allow the user to specify the conditionals more specifically, perhaps using the recommended baseline conditionals as a starting point.

Once the user has viewed the information relating to the feature, the process may dequeue 311 the feature. If the feature includes a configuration option 313, the process may display 315 a current configuration of the feature (the base OEM settings, for example) and accept alteration of the configuration from the mobile application. The device can then store this configuration and either push the configuration to a vehicle over short range communication when the driver is next in the vehicle, or use a wide range network such as cellular to send 317 the configuration directly to a vehicle for immediate storage and implementation.

Figure 4:
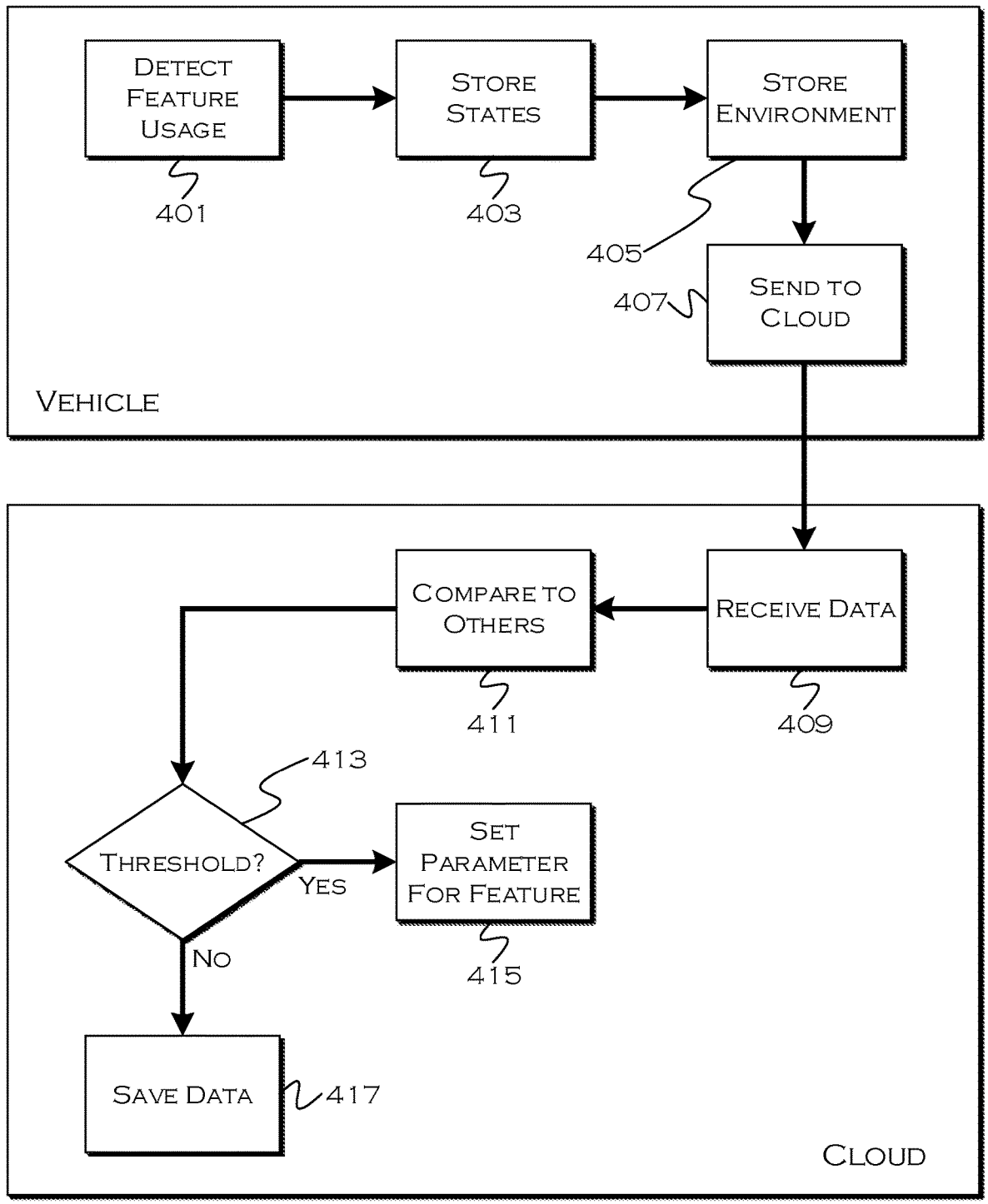
FIG. 4 shows an illustrative process for gathering data about feature usage and dynamically adjusting parameters related to feature usage for distribution to other user vehicles.

FIG. 4 shows an illustrative process between a vehicle and a server, for gathering data about feature usage and dynamically adjusting parameters related to feature usage for distribution to other user vehicles. In this example, the cloud is in communication with a plurality of traveling vehicles, and whenever a tracked feature is engaged, the process can track the feature usage as well as the states and conditionals associated with the feature usage. This allows for crowdsourcing to determine the common conditions under which the feature is activated, presumably by knowledgeable users.

In this illustrative example, the process onboard the vehicle may have a list of trackable features or may receive instructions or requests from the server to track certain features. That is, the server may dynamically determine underused features and may update which features are tracked. Or, in other examples, the process may track a predefined set of features. When a user engages a feature, the process detects 401 usage of the feature. Responsive to tracking usage of a given feature, the process may also store 403 state or condition variables at the time of activation. This can be a wide-ranging set of variables defined as possibly indicating reasons to engage a feature, or certain features may have a certain variable set associated therewith.

The process stores 403 vehicle states and 405 environmental conditions as two examples of context for feature engagement. This can include, for example, speeds, locations, temperatures, weather conditions, precipitation, light levels, etc. Once the appropriate data has been gathered, the system may send 407 the gathered data to the cloud.

The cloud, which may be responsible for the distribution of recommendations to users not using a certain feature, receives 409 the feature data from the vehicle. This process also compares 411 the received state and environment (and any other conditional) data to existing data for engaging the particular feature. If the data received aggregates current data past a threshold 413, the process may set 415 a parameter. The thresholds can include, for example, a minimum number of users or percentage of users, or the same measurements per population or capita. In another example, the thresholds could be based on a percentage or total of all users using the feature For example, if there are 1000 vehicles on the road, and 100 users use a certain feature under common conditions, this 10% total usage could be sufficient to recommend the feature usage. But, if 800 of those people commonly use the feature, and only 100 use it under certain conditions, that instance may not qualify as a viable conditional, because only 12% of actively using users use it under the certain condition. In the first example, if there were only 120 active users of the feature in the aggregate, then the 100 users also represents 86% of the active users of the feature, and the aggregate percentage of the population plus the high percentage of feature-using users may qualify the condition as a viable trigger condition. Data outside current trigger conditions or ranges may also cause a trigger or range to fall off, for example, if the first 100 users used the feature under certain first conditions, but then 700 other users did not use the feature under those conditions, but used the feature under different conditions, the first conditions may be initially enabled as trigger conditions, but eventually disabled as trigger conditions.

If the condition or state data is not sufficient to cause a parameter change, the cloud system adds 417 the data to a repository of condition data and waits for more data before adjusting a parameter.

The illustrative embodiments allow for real-time feature recommendation based on observing other users who engage features under certain conditions, improving feature usage and recommendation over typical models.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
determine that measured vehicle variable values match a predefined set of vehicle variable values associated with recommending vehicle feature engagement;
determine that the feature has not been used with a threshold frequency in a vehicle in which the variable values were measured; and
responsive to the match and use below the threshold, present a recommendation to engage the feature.

2. The system of claim 1, wherein the measured variable values include exterior temperature.

3. The system of claim 1, wherein the measured variable values include precipitation.

4. The system of claim 1, wherein the measured variable values include speed or acceleration.

5. The system of claim 1, wherein the measured variable values include location.

6. The system of claim 1, wherein the measured variable values include road surface composition.

7. The system of claim 1, wherein the measured vehicle variable values include values measured with respect to proximate, detectable vehicles.

8. The system of claim 1, wherein the predefined set of vehicle variable values represents values defined based on observed usage of the feature by a threshold percentage or number of drivers.

9. The system of claim 1, wherein the threshold frequency includes a single use.

10. The system of claim 1, wherein the processor is configured to:

offer an option to provide feature data in an automotive smartphone application; and responsive to a user accepting the offer, send a feature indicator to a cellular phone in wireless communication with the vehicle.

11. The system of claim 1, wherein the processor is configured to:

offer an option to provide feature data in an automotive smartphone application; and responsive to a user accepting the offer, instruct a cloud server to communicate feature information to a cellular phone associated with the vehicle.

12. The system of claim 1, wherein the processor is further configured to:

present a recommendation to engage the feature, responsive to a threshold number of users of the feature, within a predefined distance of the vehicle, being reported to the vehicle by a cloud server.

13. A system comprising:

a mobile-device processor configured to:

receive an indicator corresponding to a recommended vehicle feature;

determine that the feature includes a configuration option;

present a configuration option allowing for configuration of the vehicle feature on a mobile device; and send a modified configuration, configured using the configuration option, from the mobile device to a vehicle.

14. The system of claim 13, wherein the configuration option replicates an in-vehicle configuration option.

15. The system of claim 13, wherein the mobile-device processor is configured to receive the indicator directly from a vehicle.

16. The system of claim 13, wherein the mobile-device processor is configured to receive the indicator indirectly from a vehicle through the cloud.

17. The system of claim 13, wherein the mobile-device processor is configured to send the configuration directly to a vehicle.

18. The system of claim 13, wherein the mobile-device processor is configured to send the configuration indirectly to a vehicle through the cloud.

19. A system comprising:

a processor configured to:

determine that a vehicle feature has been used less than a manufacturer defined frequency;

request conditional data indicating when other users are using the vehicle feature;

receive the requested conditional data; and recommend that the vehicle feature be used responsive to measured vehicle conditions fitting parameters defined by the conditional data.

20. The system of claim 19, wherein the conditional data includes at least one of vehicle state data or environmental data.

* * * * *